US012280400B2

(12) United States Patent
Schultz

(10) Patent No.: US 12,280,400 B2
(45) Date of Patent: Apr. 22, 2025

(54) SIFTER

(71) Applicant: Stainless Equipment and Parts LLC, Auburntown, TN (US)

(72) Inventor: Edward Schultz, Auburntown, TN (US)

(73) Assignee: Stainless Equipment and Parts LLC, Auburntown, TN (US)

( * ) Notice: Subject to any disclaimer, the term of this patent is extended or adjusted under 35 U.S.C. 154(b) by 0 days.

(21) Appl. No.: 18/215,163

(22) Filed: Jun. 27, 2023

(65) Prior Publication Data

US 2025/0001456 A1 Jan. 2, 2025

(51) Int. Cl.
*B07B 1/20* (2006.01)
*B07B 1/52* (2006.01)

(52) U.S. Cl.
CPC ................ *B07B 1/20* (2013.01); *B07B 1/528* (2013.01)

(58) Field of Classification Search
CPC .................................. B07B 1/20; B07B 1/528
USPC ......................................... 209/274, 281, 283
See application file for complete search history.

(56) References Cited

U.S. PATENT DOCUMENTS 397,760 A * 2/1889 Tangenberg .............. B07B 1/20 209/283
800,797 A * 10/1905 Cross .................... B22C 5/0495 209/372
3,587,858 A * 6/1971 Christianson ............. B07B 1/20 209/390
4,410,553 A * 10/1983 McGinty ............... A47J 37/047 426/243
4,439,320 A * 3/1984 Blok ................. B01F 29/40113 210/411
4,952,309 A 8/1990 King
5,761,989 A * 6/1998 Inakuma ................. A47J 27/14 99/443 C
7,073,433 B2 * 7/2006 Burke ....................... C10F 5/04 100/126
8,511,476 B2 * 8/2013 Cassani ..................... B03B 5/32 209/288
10,751,648 B1 * 8/2020 Renfrow ................ B01D 29/54
2013/0312624 A1 * 11/2013 Cone ....................... B30B 9/125 100/37
2018/0154285 A1 * 6/2018 de los Reyes, III ...... E03F 7/10

* cited by examiner

*Primary Examiner* — Joseph C Rodriguez
(74) *Attorney, Agent, or Firm* — Lowe Graham Jones PLLC

(57) ABSTRACT

A sifter includes a screen including a cylindrical portion. A helix is positioned within the cylindrical portion and extends between a first end of the helix and a second end of the helix. The helix defines a volume, such as an annular gap extending between the first end of the helix and a second end of the helix and extending inwardly from an inner surface of the helix by at least 25 percent of an inner diameter of the inner surface of the helix, the volume being available to receive particles sifted by the sifter. The helix may be a metal coil secured at ends thereof to a shaft driven by a motor. The screen and/or endcaps secured to the screen includes an opening through which particles that do not pass through the screen are urged by the helix.

16 Claims, 3 Drawing Sheets

SIFTER

FIELD OF THE INVENTION

This application relates to sifters for flour or other items that are to be sorted by size.

BACKGROUND OF THE INVENTION

Many items, such as flour, coffee beans, or other products need to be sorted by size. In the case of powdered goods, a sifter may be used. An improved sifter is described hereinbelow.

SUMMARY OF THE INVENTION

In one aspect of the invention, a sifter includes a screen including a cylindrical portion. A helix is positioned within the cylindrical portion and extends between a first end of the helix and a second end of the helix. The helix defines a volume extending between the first end of the helix and a second end of the helix and extending inwardly from an inner surface of the helix by at least 25 percent of an inner diameter of the inner surface of the helix, the volume being available to receive particles sifted by the sifter.

In some embodiments, the volume is an annular gap extending between the first end and the second end and extending inwardly from the inner surface of the helix by at least 35 percent of the inner diameter. The annular gap contains no structure of the sifter and is completely available to be occupied by the particles sifted by the sifter. In some embodiments, the annular gap extends inwardly from the inner surface of the helix by at least 40 percent of the inner diameter.

In some embodiments, the helix has at least 5 loops between the first end and the second end. In some embodiments, the helix has at least 10 loops between the first end and the second end.

In some embodiments, the screen is perforated with openings no larger than a screen diameter, a gap between the helix and the screen being less than two times the screen diameter.

In some embodiments, a shaft extends through the helix, the helix being mounted to the shaft. The helix may be mounted to the shaft only at the first end and the second end of the helix. The shaft may define a first opening and a second opening, the second opening being non-parallel to the first opening, a first end portion secured to the first end of the helix extending into the first opening and a second end portion secured to the second end of the helix extending into the second opening. In some embodiments, the first opening and the second opening are substantially perpendicular to one another. The first opening and the second opening may be substantially perpendicular to an axis of symmetry of the shaft. The helix may be a metal rod bent to form a helix, the first end portion and the second end portion being end portions of the metal rod. In some embodiments, a motor is coupled to the shaft.

In some embodiments, the screen defines an opening, the helix configured to urge a portion of the particles that do not pass through the screen out of the opening.

In some embodiments, a first end cap is secured over a first end of the cylindrical portion and a second end cap is secured over a second end of the cylindrical portion, the first end cap defining an opening and the helix configured to urge a portion of the particles that do not pass through the screen out of the opening.

In some embodiments, the screen includes a first portion secured to a first side of the cylindrical portion and a second portion secured to a second side of the cylindrical portion, the first and second portions being oriented tangent to the cylindrical portion. In some embodiments, the first portion and the second portion are perforated.

In some embodiments, the screen is mounted within a chute including one or more legs configured to hold the chute elevated above a support surface. In some embodiments, the screen defines a rim extending outwardly therefrom and the chute defines one or more projections configured to engage the rim.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
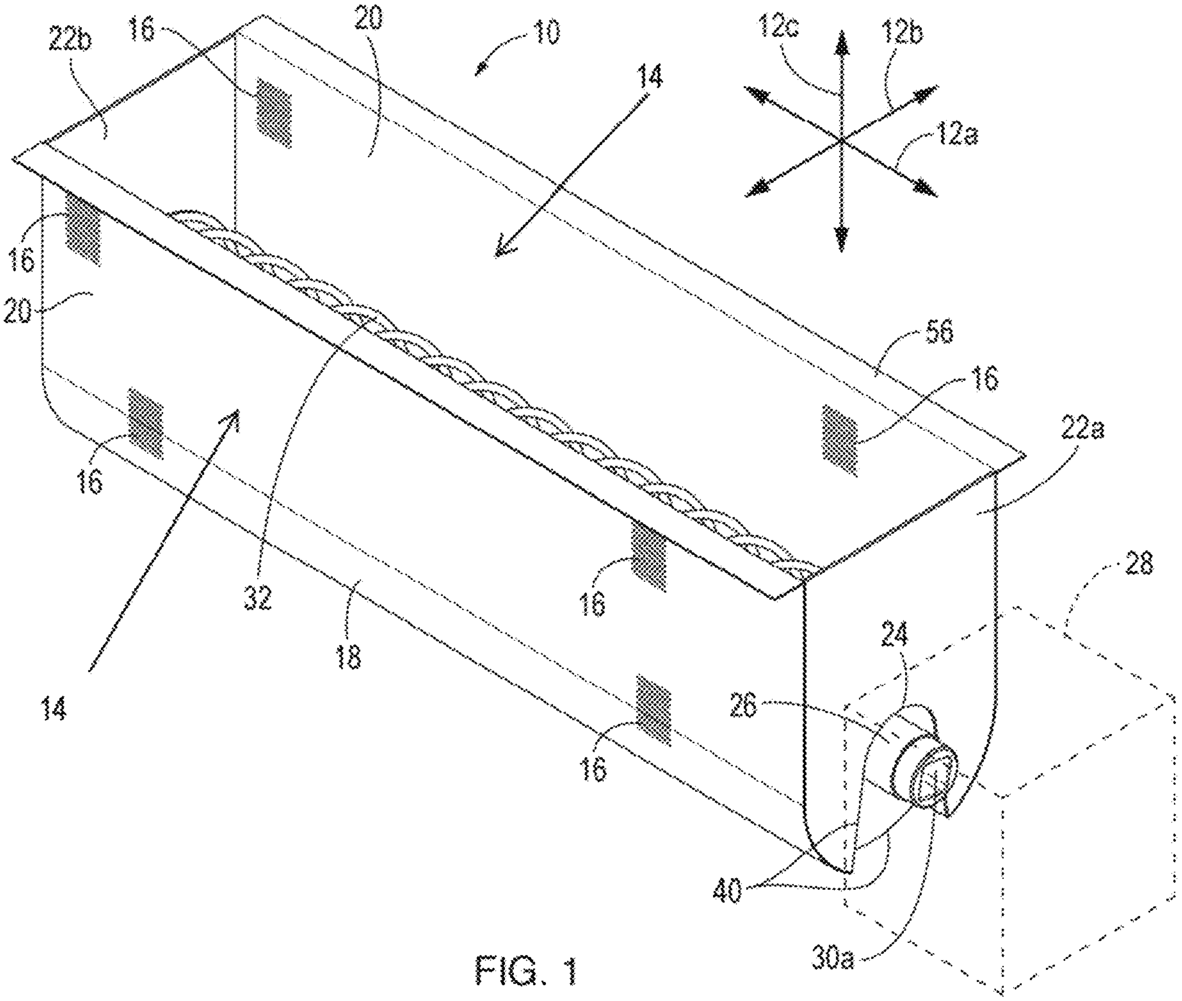
FIG. 1 is an isometric view of a sifter assembly in accordance with an embodiment of the present invention.

Referring to FIGS. 1 to 4, a sifter assembly 10 may be used to sift flour, beans, or other edible material or powders, gravel, or other non-edible material. In the following description, material sifted using the sifter assembly 10 is referred to as particles. The sifter assembly 10 may be understood with respect to a longitudinal direction 12*a*, a horizontal direction 12*b*, and a vertical direction 12*c* that are all mutually perpendicular to one another. The sifter assembly 10 and other structures disclosed herein may be made of metal, such as steel, stainless steel, aluminum, rigid plastic, or other suitable material.

The sifter assembly 10 includes a screen 14. The screen 14 is perforated, such as a regular or random arrangement of openings 16. The openings 16 have a first size corresponding to the maximum size of a particles that are permitted to pass through the screen 14 with larger particles being blocked by the screen 14 from passing therethrough. For example, for a screen 14 configured to sift flour, the openings 16 may be circles with a diameter of between 0.5 mm (e.g., for flour) and 8 mm (e.g., for coffee beans), though other sizes may also be used. The separation between the openings 16 may be between 1 and 16 mm, measured from center to center of the openings 16. Note that larger sizes for the openings 16 may be used where larger items are to be sorted. For example, stated generally, the openings 16 may be between 0.001 and 0.05 times the diameter of the cylindrical portion 18 and may have a separation from center to center that is between 0.002 and 0.1 times the diameter of the cylindrical portion.

The screen 14 may include a cylindrical portion 18. The cylindrical portion may conform to a cylinder having an axis of symmetry substantially (e.g., within 3 m of) centered on and substantially (e.g., within 5 degrees of) parallel to the longitudinal direction 12*a*. The length of the cylindrical portion 18 along the longitudinal direction 12*a* may be sufficient to achieve a desired amount of throughput of particles when sifting. For example, the cylindrical portion 18 may have a length of between 3 and 10 times the diameter of the cylinder. The openings 16 may be distributed over 75 percent, 80 percent, 90 percent, or 95 percent of the area of the cylindrical portion 18.

The screen 14 may also include portions 20 extending outwardly from the cylindrical portion 18. The portions 20 may be tangent to the cylindrical portion 18 at a point of attachment to the cylindrical portion 18. The portions 20 may include openings 16 formed thereon or may be un-perforated. When perforated, the openings 16 may be distributed over 75 percent, 80 percent, 90 percent, or 95 percent of the area of the portions 20.

The cylindrical portion 18 and portions 20 may be a single piece of perforated material shaped, such as by bending, to include the cylindrical portion 18 and portions 20 or may be secured to one another by means of welding, screws, adhesive, or other fasteners.

The portions 20 in the illustrated embodiment, are substantially (e.g., within 3 mm of) planar and are substantially (e.g., within 5 degrees of) parallel to the longitudinal direction 12*a* and vertical direction 12*c*. The separation between the portions 20 in the horizontal direction 12*b* may be substantially (e.g., within 5 percent of) equal to the diameter of the cylinder. The portions 20 may extend outwardly from the cylindrical portion in the vertical direction 12*c* between 0.5 and 2 times the diameter of the cylindrical shape defined by the cylindrical portion 18, such as between 0.5 and 1 times. In other embodiments, the portions 20 are curved or planar and flare outwardly from the cylindrical portion 18 in a plane perpendicular to the longitudinal direction 12*a*. In such embodiments, the portions 20 may or may not be tangent to the cylindrical portion 18 at points of attachment to the cylindrical portion 18.

The sifter assembly may include end caps 22*a*, 22*b*. The end caps 22*a*, 22*b* are offset from one another along the longitudinal direction 12*a* and extend between the portions 20 and across each end of the cylindrical portion 18. The end caps 22*a*, 22*b* in the illustrated embodiment are unperforated, i.e., lack openings 16. The end caps 22*a*, 22*b* may be planar and substantially (e.g., within 5 degrees of) parallel to one another and may be parallel to the horizontal direction 102*b* and vertical direction 102*c*. In other embodiments, the end caps 22*a*, 22*b* may be planar or curved and flare outwardly in a plane parallel to the longitudinal direction 102*a* and vertical direction 12*c*. The end caps 22*a*, 22*b* may secure to edges of the screen by means of welds, adhesive, screws, or other fastening means.

At least one of the end caps 22*a* defines an opening 24. The opening 24 may extend over the axis of symmetry of the cylinder defined by the cylindrical portion 18. A shaft 26 is positioned within the cylindrical portion 18 and may have an axis of symmetry thereof substantially (e.g., within 3 mm of) colinear with and substantially (e.g., within 5 degrees of) parallel to the axis of symmetry of the cylindrical portion 18. The shaft 26 may extend outwardly through the opening 24 or may be accessible through the opening 24. The shaft 26 may be coupled to a motor 28, such as an electric, hydraulic, or pneumatic motor 28. In the illustrated embodiment, the shaft 26 includes a non-cylindrical feature configured to engage the motor, such as the illustrated square opening 30*a*, an external square or flattened surface, or other feature.

The end of the shaft 26 opposite the end that engages the motor 28 may be rotatably mounted to the end cap 22*b*. The shaft 26 may be rotatably mounted to the end cap 22*b* by passing through an opening in the end cap 22*b*, extending into a bearing mounted to the end cap 22*b*, or some other means. In the illustrated embodiment, the shaft 26 defines an opening 30*b* that receives a pin 30*c* mounted to the end cap 22*b*, the pin 30*c* being rotatable relative to the opening 30*b*.

Figure 2:
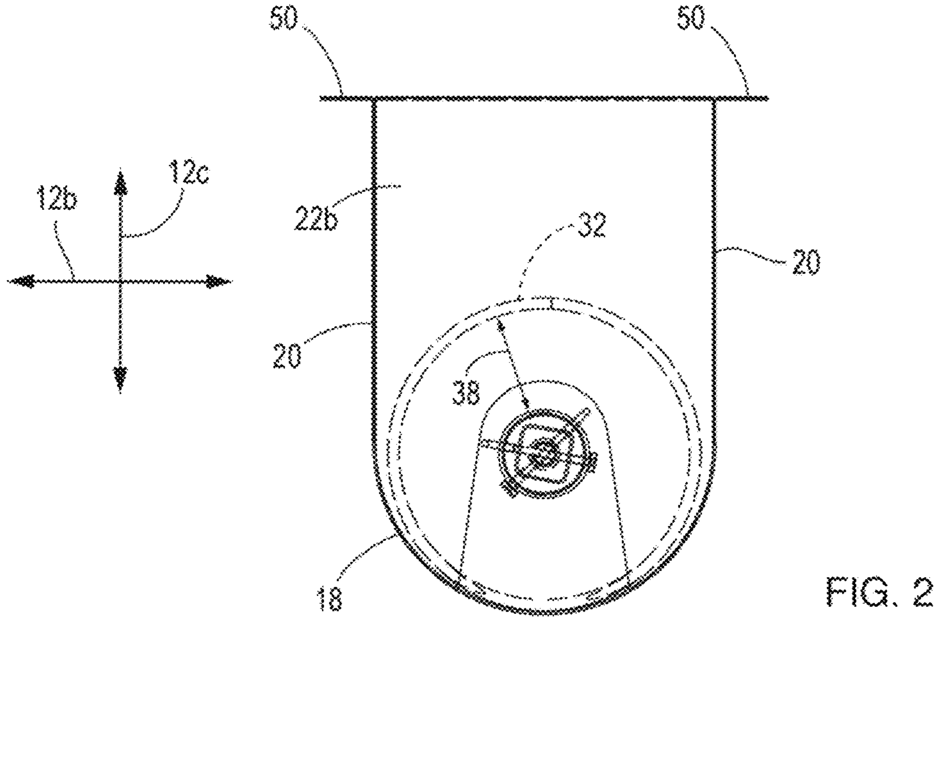
FIG. 2 is a front elevation view of the sifter assembly of FIG. 1.
Figure 3:
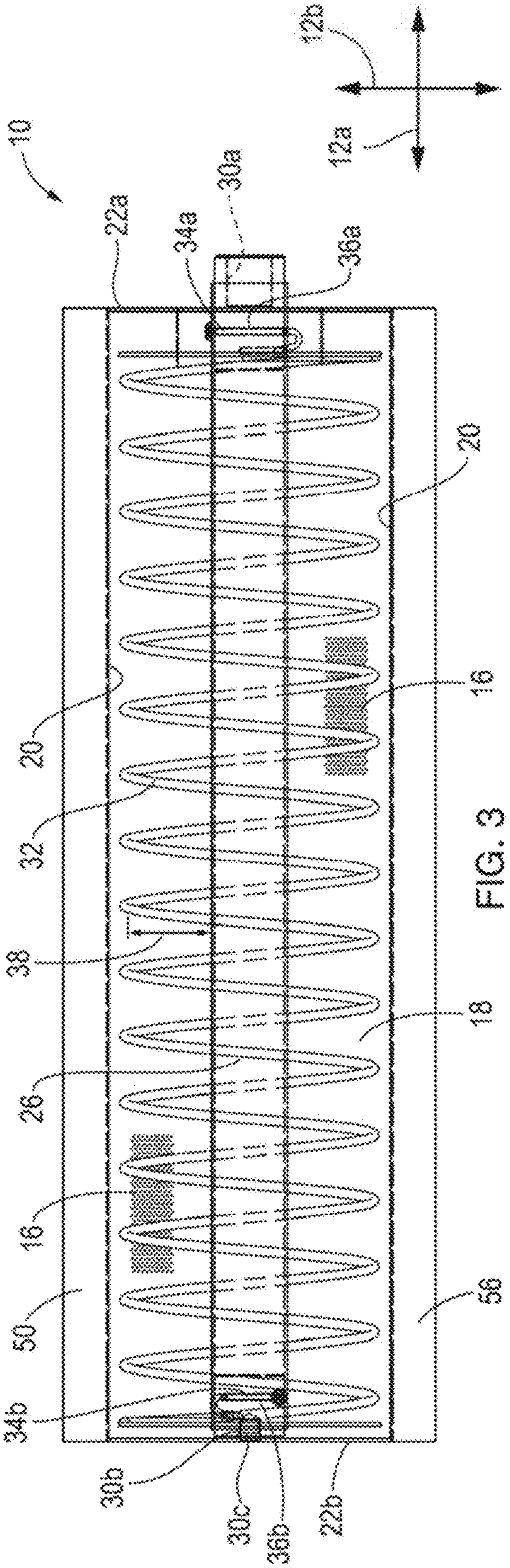
FIG. 3 is a top view of the sifter assembly of FIG. 1.
Figure 4:
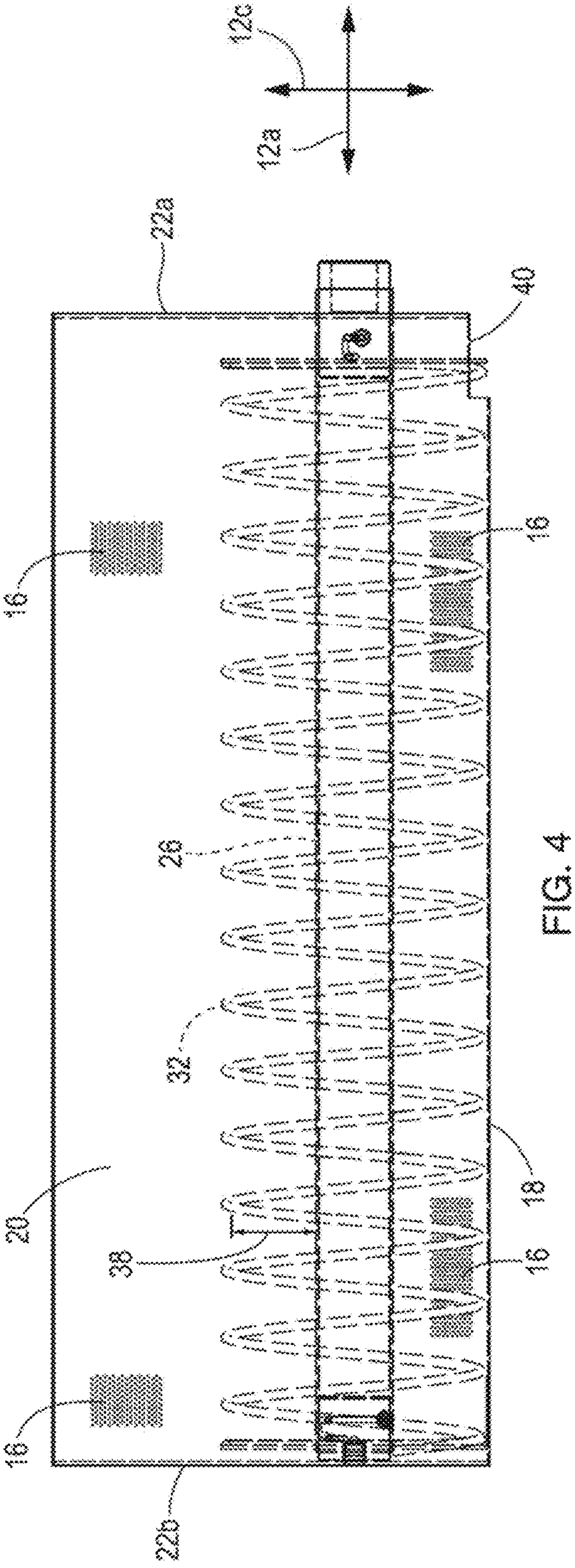
FIG. 4 is a side elevation view of the sifter assembly of FIG. 1.

Referring to FIGS. 2 to 4, while still referring to FIG. 1, a helix 32 is positioned within the cylindrical portion 18 between the end caps 22 and around the shaft 26. Absent a deforming force, the helix 32 may spiral about an axis that is substantially (e.g., within 3 mm of) and substantially (e.g., within 5 degrees of) parallel to some or all of the cylindrical portion 18, shaft 26, and longitudinal direction 102*a*. The helix 32 may define a cylindrical shape positioned within the helix 32 and on which the inner surface of the helix substantially lies, e.g., a cylindrical shape such that each point on the inner surface of the helix 32 is within 2 mm of the cylindrical shape. The outer surface of the helix 32 is sized to fit within the cylindrical portion 18 either with or without deformation of the helix 32 and/or cylindrical portion 18. The helix 32 when positioned in the cylindrical portion 18 may scrape along the inner surface of the cylindrical portion 18 to sweep particles through the openings 16 or out of the sifting assembly 10. For example, the cylindrical portion 18 may provide some flexibility to conform to the helix 32 such that the undeformed outer diameter of the helix 32 may be slightly larger than the undeformed inner diameter of the cylindrical portion 18, such as up to 1.0001 times, 1.001, or 1.01 times the inner diameter of the cylindrical portion. Alternatively, the helix 32 may deform to fit within the cylindrical portion 18. The helix 32 may be sized such that the helix 32, when substantially (within 2 mm of colinear and within 3 degrees of parallel) aligned with the axis of symmetry of the cylindrical portion 18 defines a gap between the helix 32 and the cylindrical portion 18 that is between 0 and 1 times, between 0 and 0.5 times, or between 0 and 0.1 times the maximum size of the openings 16.

The helix 32 may be made of steel, stainless, steel, or other material. The helix 32 may have a thickness that is selected to both (a) avoid deformation during use and (b) provide sufficient area to move particles along the inner surface of the screen 14. For example, the diameter of a metal rod used to form the helix 32 may be between 0.01 and 0.1 times the diameter of the cylindrical shape defined by the helix 32. The pitch of the helix 32, i.e., the separation between each loop of the helix 32 along the axis of symmetry of the cylindrical shape, may be between 0.1 and 0.5 times the diameter of the cylindrical shape defined by the helix 32. In some embodiments, the helix 32 includes at least 5 loops, at least 10 loops, or at least 15 loops.

End portions 34*a*, 34*b* secure to the helix 32 and bend inwardly into the cylindrical shape. For example, the helix 32 and end portions 34*a*, 34*b* may be embodied as a single metal rod bent into a helical shape with end portions 34*a*, 34*b*. The shaft 26 may define openings 36*a*, 36*b* offset from one another along the longitudinal direction 12*a*. The openings 36*a*, 36*b* may be non-parallel with respect to one another. For example, the openings 36*a*, 36*b* may be substantially perpendicular to one another, such as rotated between 80 and 90 degrees about the longitudinal direction 12*a* relative to one another. The end portions 34*a*, 34*b* insert within the openings 36*a*, 36*b*, respectively. The end portions 34*a*, 34*b* may be retained within the openings 36*a*, 36*b* by some or all of (a) the rigidity of the helix 32 and the fact that the openings 34*a*, 34*b* are non-parallel to one another, (b) set screws, (c) interference fit, (d) welds, adhesive, or (e) some other fastener.

As is apparent, an annular gap 38 is present between the helix 32 and the shaft 26. For example, the annular gap 38 may have a thickness perpendicular to the axis of symmetry of the shaft 26 of at least 0.25, at least 30, at least 35, or at least 45 percent of the inner diameter of the helix 32, i.e., the cylindrical shape defined by the inner surface of the helix as defined above. The gap 38 extends at least between the end portions 34*a*, 34*b* and may have a length along the longitudinal direction of between 0.7 and 1, such as between 0.9 and 1 times the separation between the end caps 22*a*, 22*b* along the longitudinal direction 12*a*. In some embodiments, no portion of the sifter assembly 10 extends into the annular gap 38 between the end portions 34*a*, 34*b* such that only particles being sifted using the sifter assembly 10 are present in the annular gap 38 during use.

In some embodiments, the shaft 26 is eliminated. For example, end portion 34*a* may engage the motor 28 and end portion 34*b* may be rotatably connected to the end cap 22*b*. In such embodiments the annular gap 38 has a thickness of up to 100 percent of the volume of the cylindrical shape and may be embodied as a cylindrical volume rather than annular gap 38.

One or both of the screen 14 and one of the end caps 22*a*, 22*b* defines an opening 40 that is larger than the openings 16, e.g., at least 2 times, at least 8 times, at least 16 times, or at least 32 times larger than the openings 16 in at least one of the directions 12*a*, 12*b*, 12*c*. In the illustrated embodiment, the opening 40 is an extension of the opening 24 providing access for the shaft 26 to couple to the motor 28. In the illustrated embodiment, the opening 40, or a separate opening, extends at least partially along the screen 14. For example, the opening 40 extends inwardly into the screen 14 along the longitudinal direction 12*a*, such as a distance that is between 0.05 or at least 0.5 times the diameter of the cylindrical portion 18. The opening 40, or a separate opening, may be positioned at the bottom of the screen 14, i.e., in the cylindrical portion opposite the portions 20 overlapping a midpoint of the cylindrical portion 18 between the portions 20. The opening 40 permits particles that are too large to pass through the openings 16 of the screen 14 to fall out of the sifter assembly 10.

Figure 5:
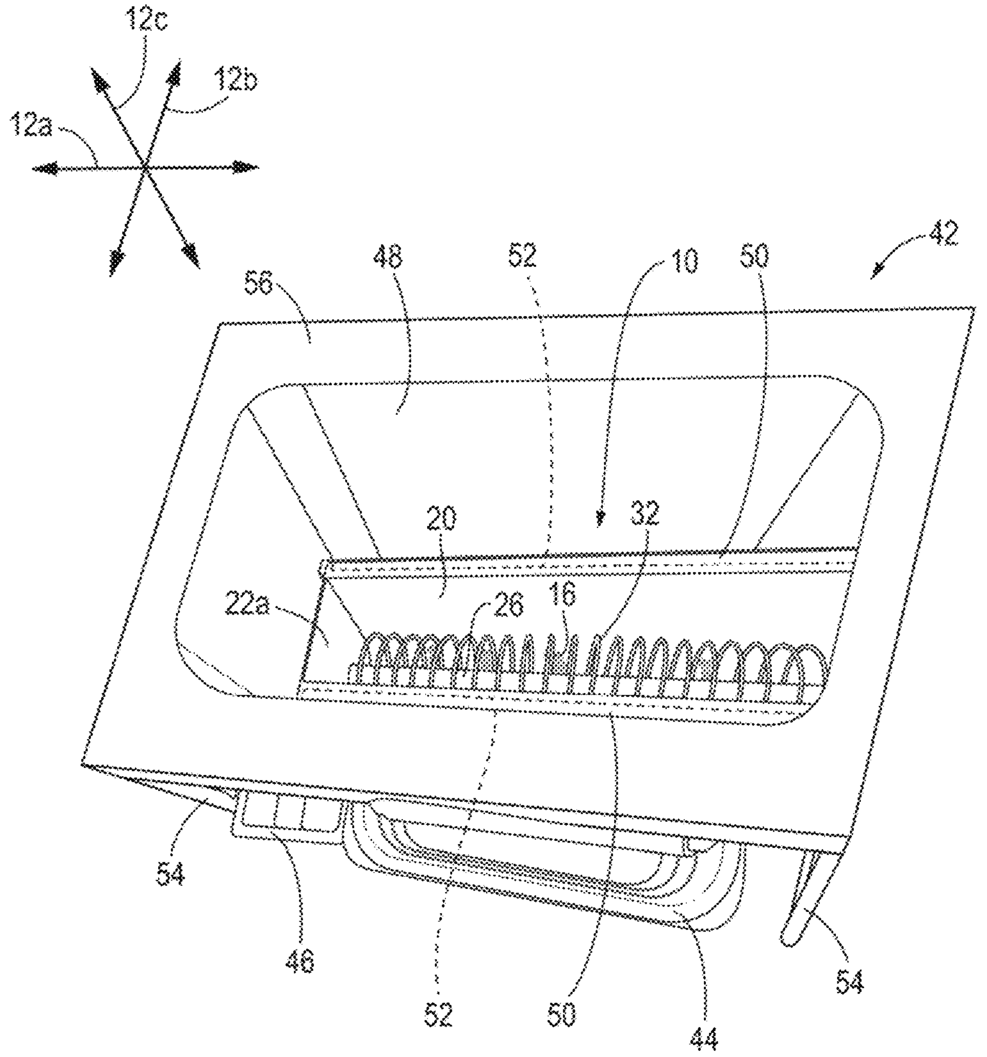
FIG. 5 is a perspective view of the sifter assembly in use in accordance with an embodiment of the present invention.

Referring to FIG. 5, while still continuing to refer to FIGS. 1 to 4, the sifter assembly 10 may mount within a support 42. The support 42 may provide one or more functions including: (1) maintaining the sifter assembly 10 above a bin 44 for collecting first particles that pass through the openings 16 during sifting and a bin 46 for collecting second particles that do not pass through the openings 16, (2) provide a funnel for directing particles into the sifter assembly 10, (3) provide a mounting location for the motor 28.

The support 42 may define a chute 48. The chute 48 may have sides substantially parallel to the vertical direction 12*c* or that flare outwardly with distance above the sifter assembly 10. The sifter assembly 10 may include a rim 50 or other structure extending outwardly from one or both of the screen 14 and the end caps 22*a*, 22*b*. For example, the rim 50 may be formed by bending outwardly the upper edges of the single piece of material forming the screen 14 or by securing separate pieces of material to upper edges of the portions 20 and extending outwardly from the screen 14. One or more protrusions 52 extend inwardly into the chute 48, such as from a bottom edge of the chute 48. The one or more protrusions 52 engage one the rim 50 of the sifter assembly to maintain the sifter assembly 10 within the chute 48 and/or positioned to receive particles passing through the chute 48.

The chute 48 may be mounted to legs 54 configured to maintain the chute 48 elevated above a surface supporting the chute 48. For example, a rim 56 may extend outwardly from the chute 48 with the legs 54 being mounted to the rim 56.

During use, the motor 28, a hand crank, or some other source of torque, rotates the shaft 26 such that the helix 32 pushes the second particles that will not fit through the openings 16 to the opening 40. For example, for the right-handed helix 32 shown, the helix 32 may be rotated counter clockwise from the point of view shown in FIG. 2. For a left-handed helix 32, the direction of rotation would be clockwise.

The sifter assembly 10 provides various advantages, including without limitation the following:

The volume within the sifter assembly is relatively open due to the gap 38 between the helix 32 and shift and can therefore receive a large volume of particles to be sifted.

The upper portions of the loops of the helix 32 move at an angle across a stream of particles passing into the sifting assembly 32, which begins to break up clumps within the stream of particles before the stream of particles hits the screen 14.

The area of the helix 32 is relatively small compared to a solid screw, which facilitates the breakup of lumps rather than simply sweeping the lumps out of the sifter assembly 10.

Similarly, the volume of particles swept toward the opening by the helix 32 is relatively small compared to the volume of the cylinder defined by the outer surface of the helix 32. Accordingly, particles within the helix 32 will be tumbled and scraped multiple times before reaching the opening 40, thereby increasing the probability that lumps that can be broken up will be broken up rather than being swept out of the opening 40.

Prior approaches using a helical brush (see U.S. Pat. No. 4,952,309) sweep particles too rapidly into the opening 40 and therefor do not sift as quickly and efficiently as the sifting assembly 10 and are further less convenient to clean.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A sifter comprising:

a screen including a cylindrical portion, wherein the screen further comprises a first portion secured to a first side of the cylindrical portion and a second portion secured to a second side of the cylindrical portion, the first and second portions being oriented tangent to the cylindrical portion;

a helix positioned within the cylindrical portion and extending between a first end of the helix and a second end of the helix, the helix defining a volume extending between the first end of the helix and a second end of the helix and extending inwardly from an inner surface of the helix by at least 25 percent of an inner diameter of the inner surface of the helix, the volume being available to receive particles sifted by the sifter; and a shaft extending through the helix, the helix being mounted to the shaft, wherein the shaft defines a first opening and a second opening, the second opening being non-parallel to the first opening, a first end portion secured to the first end of the helix extending into the first opening and a second end portion secured to the second end of the helix extending into the second opening.

2. The sifter of claim 1, wherein the volume is an annular gap extending between the first end and the second end and extending inwardly from the inner surface of the helix by at least 35 percent of the inner diameter.

3. The sifter of claim 2, wherein the annular gap contains no structure of the sifter and is completely available to be occupied by the particles sifted by the sifter.

4. The sifter of claim 2, wherein the annular gap extends inwardly from the inner surface of the helix by at least 40 percent of the inner diameter.

5. The sifter of claim 1, wherein the helix has at least 5 loops between the first end and the second end.

6. The sifter of claim 1, wherein the helix has at least 10 loops between the first end and the second end.

7. The sifter of claim 1, wherein the screen is perforated with openings no larger than a screen diameter, a gap between the helix and the screen being less than two times the screen diameter.

8. The sifter of claim 1, wherein the first opening and the second opening are substantially perpendicular to one another.

9. The sifter of claim 8, wherein the first opening and the second opening are substantially perpendicular to an axis of symmetry of the shaft.

10. The sifter of claim 1, wherein the helix comprises metal rod bent to form a helix, the first end portion and the second end portion comprising end portions of the metal rod.

11. The sifter of claim 1, further comprising a motor coupled to the shaft.

12. The sifter of claim 1, wherein the screen defines an opening, the helix configured to urge a portion of the particles that do not pass through the screen out of the opening.

13. The sifter of claim 1, further comprising a first end cap secured over a first end of the cylindrical portion and a second end cap secured over a second end of the cylindrical portion, the first end cap defining an opening and the helix configured to urge a portion of the particles that do not pass through the screen out of the opening.

14. The sifter of claim 1, wherein the first portion and the second portion are perforated.

15. A sifter comprising, a screen including a cylindrical portion, wherein the screen defines a rim extending outwardly therefrom;

a chute including one or more legs configured to hold the chute elevated above a support surface, the chute defining one or more projections configured to engage the rim, the screen being mounted within the chute; and a helix positioned within the cylindrical portion and extending between a first end of the helix and a second end of the helix, the helix defining a volume extending between the first end of the helix and a second end of the helix and extending inwardly from an inner surface of the helix by at least 25 percent of an inner diameter of the inner surface of the helix, the volume being available to receive particles sifted by the sifter.

16. The sifter of claim 15, wherein the volume is an annular gap extending between the first end and the second end and extending inwardly from the inner surface of the helix by at least 35 percent of the inner diameter.

* * * * *